United States Patent
Kobayashi et al.

(10) Patent No.: US 6,853,782 B2
(45) Date of Patent: Feb. 8, 2005

(54) OPTICAL FIBER DROP CABLE

(75) Inventors: Kazunaga Kobayashi, Chiba (JP);
Masahiro Kusakari, Chiba (JP);
Matsuhiro Miyamoto, Chiba (JP);
Hirohito Watanabe, Chiba (JP); Keiji Ohashi, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/194,226

(22) Filed: Jul. 15, 2002

(65) Prior Publication Data

US 2003/0012529 A1 Jan. 16, 2003

(30) Foreign Application Priority Data

| Jul. 16, 2001 | (JP) | ................................. P2001-215580 |
| Sep. 18, 2001 | (JP) | ................................. P2001-283869 |
| Feb. 5, 2002 | (JP) | ................................. P2002-028492 |

(51) Int. Cl.[7] ............................................. G02B 6/44
(52) U.S. Cl. ....................................................... 385/113
(58) Field of Search ................................. 385/100, 106, 385/113, 114

(56) References Cited

U.S. PATENT DOCUMENTS

| 4,761,053 A | * | 8/1988 | Cogelia et al. ............. 385/118 |
| 5,789,701 A | * | 8/1998 | Wettengel et al. ............ 174/41 |
| 6,181,851 B1 | * | 1/2001 | Pan et al. ...................... 385/37 |
| 6,185,350 B1 | * | 2/2001 | Tachikura et al. .......... 385/102 |
| 6,356,690 B1 | * | 3/2002 | McAlpine et al. .......... 385/109 |
| 6,459,837 B1 | * | 10/2002 | Fitz et al. .................... 385/113 |

FOREIGN PATENT DOCUMENTS

| JP | 2001-083385 | * | 3/2001 |
| WO | WO 01/07953 | * | 2/2001 |

* cited by examiner

*Primary Examiner*—Chandrika Prasad
(74) *Attorney, Agent, or Firm*—Oblon, Spivak, McClelland, Maier & Neustadt, P.C.

(57) ABSTRACT

An optical fiber drop cable includes an optical element portion having an optical fiber core wire and a pair of first tension members disposed parallel to the optical fiber core wire on both sides thereof in a sandwiching manner. The optical fiber core wire and the pair of first tension members are coated with a cable sheath. A long-scale cable support wire portion has a second tension member coated with a sheath. The optical element portion and the cable support wire portion are adhered parallel to each other. The first tension members are composed of a nonconductive material. A flexural rigidity of the optical element portion is in a range from 80 to 500 $Nmm^2$.

11 Claims, 5 Drawing Sheets

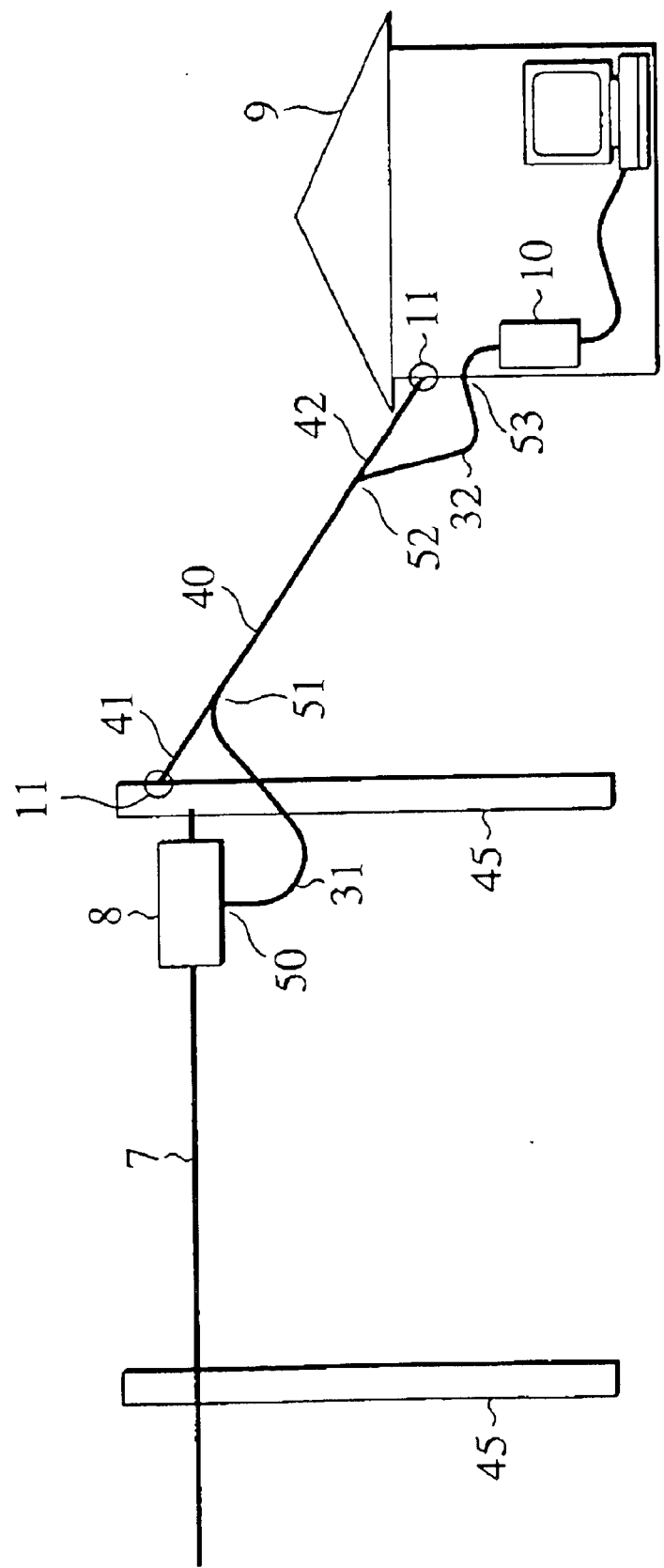

FIG.8

| SIZE OF TENSION MEMBER | 0.4mmø | 0.38mmø | 0.35mmø | 0.2mmø | 0.16mmø | 0.10mmø |
|---|---|---|---|---|---|---|
| FLEXURAL RIGIDITY [Nmm²] | 550 | 500 | 400 | 100 | 80 | 70 |
| ACCOMMODABILITY | NO | YES | YES | YES | YES | YES |
| SEPARATABILITY | YES | YES | YES | YES | YES | NO |

FIG.9

| YARN FINENESS (PER FIBER) | 2000d | 1850d | 1500d | 3500d | 2500d | 1000d |
|---|---|---|---|---|---|---|
| FLEXURAL RIGIDITY [Nmm²] | 550 | 500 | 400 | 100 | 80 | 60 |
| ACCOMMODABILITY | NO | YES | YES | YES | YES | YES |
| SEPARATABILITY | YES | YES | YES | YES | YES | NO |

FIG.10

| SIZE OF TENSION MEMBER | 1.2mmø | 1.15mmø | 1.0mmø | 0.6mmø | 0.48mmø | 0.45mmø |
|---|---|---|---|---|---|---|
| FLEXURAL RIGIDITY [Nmm²] | 550 | 500 | 400 | 100 | 80 | 75 |
| ACCOMMODABILITY | NO | YES | YES | YES | YES | YES |
| SEPARATABILITY | YES | YES | YES | YES | YES | NO |

OPTICAL FIBER DROP CABLE

BACKGROUND OF THE INVENTION

In order to realize the FTTH (Fiber to the Home), that is, to make it possible to transmit/receive high-speed and wide-range information such as ultra high speed data to/from a home and an office, an optical fiber drop cable has been used, which is suitable for dropping a core wire of an optical fiber cable extended from a telephone station to a subscriber's house such as a general house and wiring this core wire there. Specifically, the optical fiber drop cable (outside wire) is a cable for use when the optical fiber is led from an electric pole into the home.

As shown in FIG. 1, an optical fiber drop cable including an optical fiber core wire or optical fiber tape core wire 101 and a pair of conductive metal wires on both sides thereof has been known. Such an optical fiber drop cable includes an optical element portion 102 having the optical fiber core wire and tension members T composed of, for example, steel wires added thereto, both of which are coated in a lump with a cable sheath S formed of a thermoplastic resin, and includes a cable support wire portion 103 having a support wire R composed of a metal wire, for example, a steel wire, which is coated with a sheath S formed of a thermoplastic resin, in which the optical element portion 102 and the cable support wire portion 103 are monolithically connected parallel to each other with a constricted neck portion 104 interposed therebetween.

When the optical fiber core wire is dropped to each home from the optical fiber cable extended from the telephone station by use of this optical fiber drop cable, neck portions 104 on both-side ends of this drop cable are partially torn, and on each side, the optical element portion 102 and the support wire portion 103 are separated. Then, one of the separated support wire portions 103 is fixed to an outside wire holdback of the electric pole, and the other thereof is fixed to a part of the house with a holdback interposed there between.

And, one end of the optical element portion 102 is connected to a cable junction box (cable closure) on the electric pole, and the other end is connected to an OE converter or a termination cabinet inside the house.

SUMMARY OF THE INVENTION

1. Problem of Thunderbolt Accident

However, since the tension members T of the optical element portion 102 are conductive metal wires, a portion thereof led inside the house is exposed to danger of a thunderbolt accident, which is dangerous and unpreferable.

In order to solve the problem as described above, a fist technical aspect of the present invention provides an optical fiber drop cable, in which a conductive material is not used for the optical element portion wired to the inside of the house, a sufficient tensile strength property is imparted, and thus prevention of thunderbolt is achieved, and reduction of cable cost is achieved.

Specifically, the first technical aspect of the present invention provides an optical fiber drop cable including a long-scale optical element portion having an optical fiber core wire and at least a pair of first tension members disposed parallel to the optical fiber core wire on both sides thereof in a sandwiching manner, the optical fiber core wire and the first tension members being coated with a cable sheath, and a long-scale cable support wile portion having another second tension member coated with a sheath, wherein the optical element portion and the cable support wire portion are fixed parallel to each other continuously or intermittingly, the first tension members of the optical element portion is nonconductive, and at least one thereof is constituted of an aggregate of tension fibers.

Moreover, the optical fiber drop cable is constituted in such a manner that the cable sheath coating the optical fiber core wire and the first tension members and the sheath coating the second tension member are composed of a common and same thermoplastic resin and adhered monolithically.

Furthermore, the optical fiber drop cable is constituted in such a manner that a single fiber of the nonconductive tension fibers constituting the first tension member of the optical element portion has a Young's modulus of 5000 kg/mm$^2$ or more and a thickness ranging from 1000 to 2000 denier.

2. Problem of Accommodation in Cable Junction Box

When the optical fiber drop cable 40 is accommodated in a cable junction box 8, as described above, the optical element portions 31 and 32 and the cable support wire portions 41 and 42 are separated, and thus repulsive force when the optical element portions 31 and 32 are bent is made to be reduced. However, the optical element portions 31 and 32 are obviously inferior in accommodation to the single optical fiber core wire 1, and therefore, there has been a problem that it is difficult to accommodate the optical element portions into the cable junction box 8.

Moreover, there has been another problem that work of taking the optical fiber core wire 1 long out of the optical element portion is cumbersome.

According to a second technical aspect of the present invention, in order to solve the above-described problems, it is possible to provide an optical fiber drop cable, in which workability of accommodating the optical element portion into the cable closure is improved.

Specifically, the second technical aspect of the present invention provides an optical fiber drop cable including a long-scale optical element portion having an optical fiber core wire and at least one pair of first tension members disposed parallel to the optical fiber core wire on both sides thereof in a sandwiching mailer, the optical fiber core wire and the first tension members being coated with a cable sheath, and a long-scale cable support wire portion having a second tension member coated with a sheath, the optical element portion and the cable support wire portion being adhered parallel to each other, wherein a flexural rigidity of the optical element portion is in a range from 80 to 500 Nmm$^2$.

When each of the first tension members of the optical element portion is a steel wire, in order to set the flexural rigidity of the optical element portion in a range from 80 to 500 Nmm$^2$, a diameter of the steel wire can be set in a range from 0.16 to 0.38 mm.

When an aramid fiber is used for the first tension member of the optical element portion, in order to set the flexural rigidity of the optical element portion in a range from 80 to 500 Nmm$^2$, a yarn fineness of the aramid fiber can be set in a range from 2500 to 18500 denier.

Furthermore, when the first tension member of the optical element portion is engineering plastics, in order to set the flexural rigidity of the optical element portion in a range from 80 to 500 Nmm$^2$, a diameter of the engineering plastics can be set in a range from 0.48 to 1.15 mm.

BRIEF DESCRIPTION OF THE DRAWINGS

FIG. 4 is an explanatory view showing an execution situation of cabling according to the present invention.

FIG. 8 is a table showing evaluation results when steel wires are used for a tension member.

FIG. 9 is a table showing evaluation results when Kevlars are used for the tension member.

FIG. 10 is a table showing evaluation results when engineering plastics are used for the tension member.

DESCRIPTION OF THE PREFERRED EMBODIMENT

First Embodiment

Figure 1:
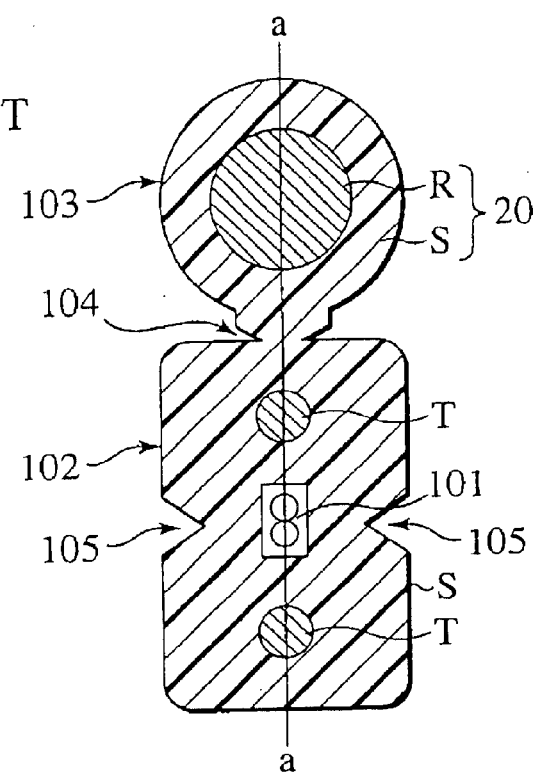
FIG. 1 is a cross-sectional view of a conventional optical drop cable.
Figure 2:
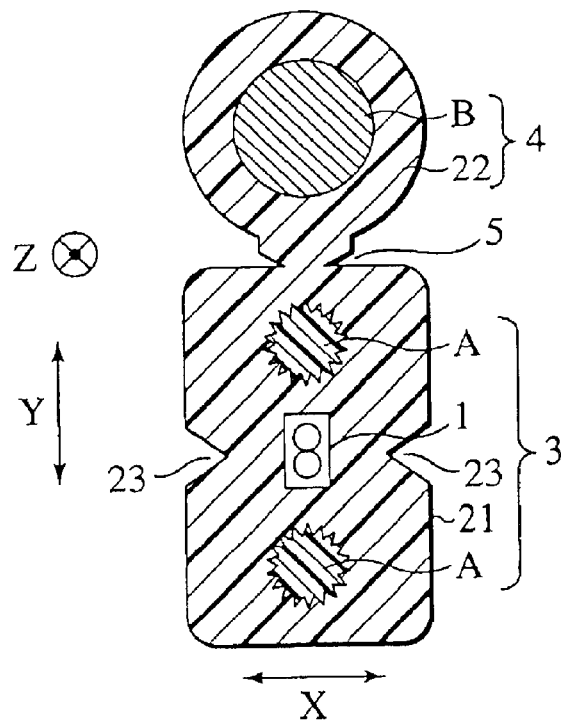
FIG. 2 is a cross-sectional view showing a first embodiment of the present invention.
Figure 3:
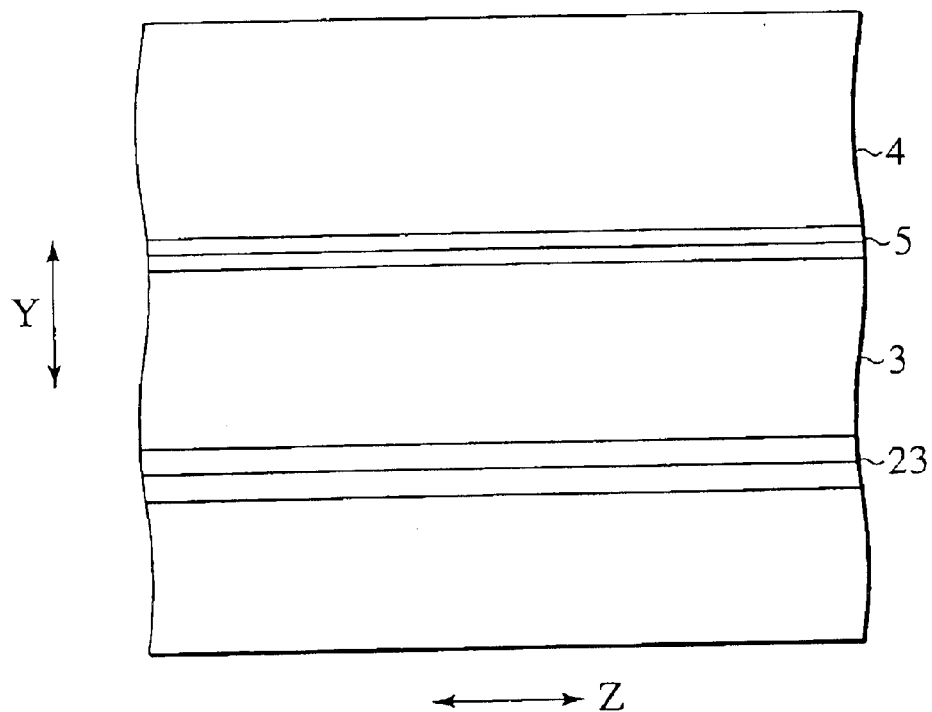
FIG. 3 is a side view of FIG. 2.

Description will be made in detail for an embodiment with reference to FIGS. 2 to 4. When an optical fiber is dropped from an optical fiber cable hung in the air into a home, as will be described later, an optical element portion of an optical fiber drop cable is separated from a cable support wire portion, and the optical fiber is led into a subscriber's house. Accordingly, in order to prevent the subscriber's house from being struck by a thunderbolt or affected thereby, it is necessary to constitute the optical element portion entirely of a nonconductive material. Furthermore, a tensile strength property of the optical element portion must be realized in a similar extent or more to the case of using a steel wire for a tension member.

According to this embodiment, at least a pair of first tension members A, which are nonconductive and long-scale, are disposed parallel to the cable (in a Z direction) on both sides of an optical fiber single core wire or optical fiber tape core wire 1 (hereinafter, referred generically to as an optical fiber core wire) in a sandwiching mailer. These elements are coated with a cable sheath 21 formed of a thermoplastic resin such as polyethylene and polyvinyl chloride (PVC), and thus a long-scale optical element portion 3 is formed. Then, each of the pair of first tension members A is constituted by aggregating a nonconductive high-tension fiber, for example, an aramid fiber such as Kevlar™, a polymer fiber such as a poly para-phenylene benzobis oxazole (PBO) fiber obtained by spinning the PBO, a fiber reinforced plastics (FRP), a glass fiber, another aramid fiber, a fiber formed of a composite material or the like which is composed of a PBO fiber or a glass fiber and a synthetic resin. V grooves are formed on both side faces of the cable sheath 21 in alignment with a center position of the optical fiber core wire 1.

It is desirable that the Young's modulus of each fiber as described above be 49 GPa (5000 $kgf/mm^2$) or more. A quantity of the aggregated fibers is preferably set in a range from 1000 to 2000 denier. If the quantity is less than 1000 denier, then rigidity (modulus of transverse elasticity) thereof is insufficient. If the quantity exceeds 2000 denier, then an outer diameter of the cable is enlarged, and the cable will not meet a permitted wind pressure load, which is not preferable. In consideration of the permitted wind pressure load, the outer diameter of the cable is about 6 mm at maximum.

Moreover, a filling factor in the case of aggregating the above-described fibers to constitute a fiber bundle as the first tension member A implies a ratio of the sum of sectional areas of the filled tension fibers to a sectional area of the fiber bundle. If this filling density is 50% or more, then a fracture of the optical fiber core wire and an increase of a transmission loss thereof are difficult to occur during work to be described later of tearing the support wire portion and the optical element portion 3.

The above-described long-scale optical element portion 3 constituted as described above and a long-scale cable support wire portion 4 added parallel to this optical element portion 3 are monolithically constricted with a constricted neck portion 5 interposed therebetween, and thus the optical fiber drop cable is constituted.

The cable support wire portion 4 is constituted by coating another second tension member B, for example, a steel wire, with a sheath 22 formed of the thermoplastic resin. Note that, since the second tension member B must be banded to an outside wire holdback as will be described later, when the steel wire is employed, it is more preferable that an outer diameter thereof be 1.4 mm or less, and preferably, 1.2 mm or less in consideration of workability.

Note that, preferably, extrusion coating of the thermoplastic resin is carried out for the optical element portion 3 and the cable support wire portion 4 in a lump to form a common cable sheath, and thus the both thereof are monolithically adhered. Accordingly, in this case, the cable sheath 21 and the sheath 22 of the other tension member B become a common sheath.

The optical element portion 3 and the cable support wire portion 4 may be manufactured separately in advance and may be fixed intermittingly by use of third binding means, for example, plastic binding wires or plastic binding fittings.

Figure 5:
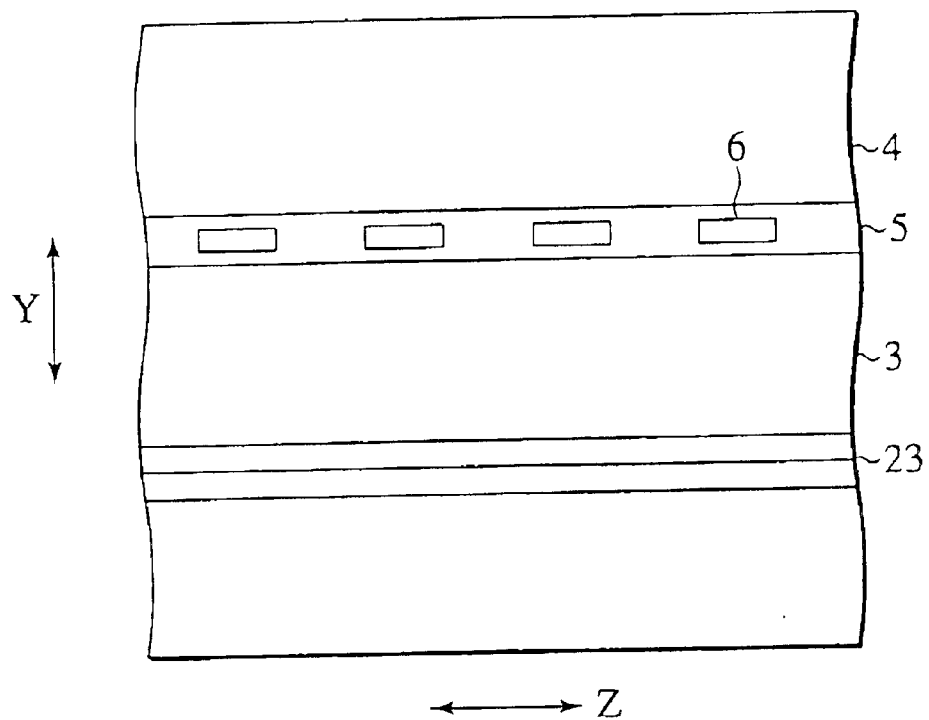
FIG. 5 is a side view showing modification example of the first embodiment.

Furthermore, as shown in FIG. 5, slits or windows 6 can be formed intermittingly in the neck portion 5 connecting the optical element portion 3 and the cable support wire portion 4 in advance, and thus the work of separating the both can be facilitated.

As shown in FIG. 4. the first tension members A can define concave portions. A portion of the cable sheath 21 can be disposed in the concave portions of the first tension members A. An example of such a first tension member A can have a generally star-shaped cross section.

Laying of Optical Fiber Drop Cable

Next, description will be made for a method of laying the optical fiber drop cable according to the present invention with reference to FIG. 4.

The optical fiber drop cable according to the present invention is wired between a subscriber's house 9 and a cable junction/connection box (closure) 8 attached to an end of an optical fiber cable 7, which is extended from a telephone station and hung in the air, the end being located on an electric pole, and thus the optical fiber is dropped from the optical fiber cable hung in the air to the home.

Then, when the optical fiber core wire is dropped from the optical fiber cable extended from the telephone station to each home by use of this drop cable, the neck portions 5 on both side ends of this drop cable are partially torn to separate the optical element portion 3 and the cable support wire portion 4. Then, one end 41 of the separated cable support wire portion is fixed to an outside wire holdback 11 on the electric pole, and the other end 42 is fixed to a part of the house with a holdback 11 interposed therebetween.

One end 31 of the optical element portion 3 is connected to the cable junction/connection box (cable closure) 8 on the electric pole, and the other end 32 is connected to an OE converter or termination cabinet 10 inside the house. In this case, the end 31 of the optical element portion 3 hangs between a connection point 50 of the cable closure and a separation point 51 from the end 41 of the cable support wire portion by a dead weight thereof, and the other end 32 hangs between the end 42 of the cable support wire portion and an intake 53 of the optical element to the inside of the house by a dead weight thereof.

Note that one terminal of the first tension member A of the optical element portion 3 is fixed to the cable junction/connection box (cable closure) 8, and the other terminal is fixed to the OE converter or termination cabinet 10 inside the house.

Moreover, when the tension member of the cable support wire portion 4 is a steel wire, from the viewpoint of a measure against a thunderbolt, it is desirable that the tension member be grounded at the time of wiring completion. The pair of first tension members A has been described above taking an example of using the nonconductive tension fiber. However, a constitution can be made, in which a tension fiber formed of a nonconductive material is used for one of the pair of first tension members A, and FRP or the like as a nonconductive material is used for the other of the pair of first tension members A.

As described above, in the present invention, each of the pair of first tension members of the optical element portion led into the house is formed of the nonconductive material, and at least one thereof is formed of the nonconductive tension fiber. The quantity of the filled fiber, the filling factor and the Young's modulus are selected to be appropriate values. Therefore, the exposure thereof to danger of a thunderbolt can be prevented, and the drop cable is excellent in the tearing work from the support wire portion, the cable cost and the wind pressure load resistance.

The cable sheath and the sheath are monolithically adhered by the common and same thermoplastic resin. Therefore, the cable sheath and the sheath can be subjected in a lump to the extrusion coating while running the optical fiber core wire and the first and second tension members together. Consequently, the manufacturing steps can be reduced, and the processing can be carried out in one step.

According to this embodiment, since the first tension member of the optical element portion led into the house is formed of the nonconductive material, the danger prevention during a thunderbolt can be achieved.

Moreover, the cable sheath and the sheath are monolithically adhered by the common and same thermoplastic resin. Therefore, the cable sheath and the sheath can be subjected in a lump to the extrusion coating while running the optical fiber core wire and the first and second tension members together. Consequently, the manufacturing steps can be reduced, and the processing can be carried out in one step.

Furthermore, the disconnection of the optical fiber is difficult to occur when tearing the optical element portion and the cable support wire portion, and the transmission loss of the optical fiber itself is not increased.

Second Embodiment

Figure 6:
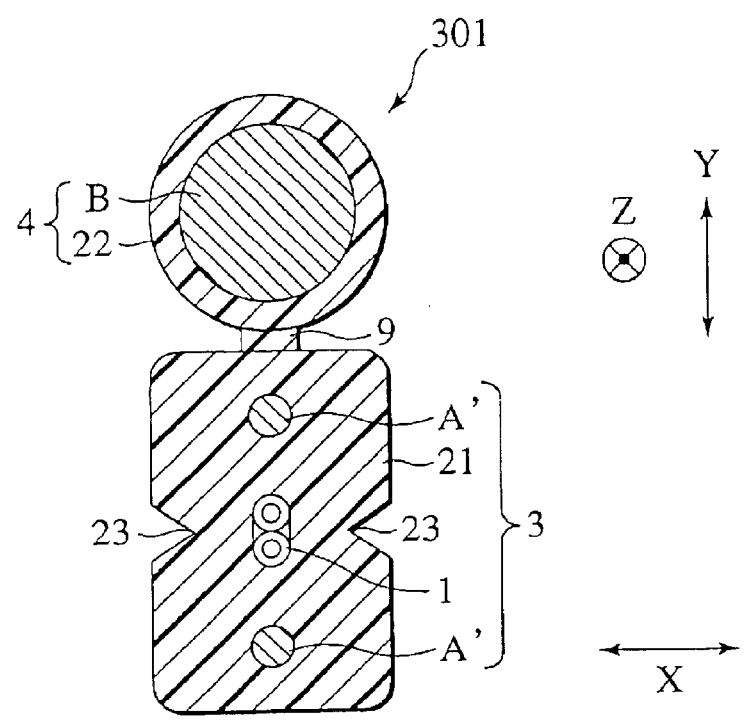
FIG. 6 is a cross-sectional view of an optical fiber drop cable of a second embodiment of the present invention.

Description will be made for a second embodiment of the present invention with reference to the drawings. With reference to FIG. 6, an optical fiber drop cable 301 according to this embodiment is constituted of a long-scale optical element portion 3 having an optical fiber single core wire or an optical fiber tape core wire (hereinafter, these are generically referred to as an optical fiber core wire 1) buried in a sheath 21 and a long-scale cable support wire portion 4 composed by being monolithically fixed parallel to this optical element portion 3 continuously or intermittingly with a constricted neck portion 9 interposed therebetween.

In the optical element portion 3, at least a pair of long-scale tension members A' as first tension members are disposed parallel to the optical fiber core wire 1 on both sides thereof in a sandwiching manner. These elements are coated with the cable sheath 21 formed of a thermoplastic resin such as polyethylene and polyvinyl chloride (PVC), and thus the long-scale optical element portion 3 is formed.

For the tension members A', for example, a steel wire as a metal wire, an aramid fiber such as Kevlar™, which is a nonconductive tension fiber, a synthetic resin such as engineering plastics or the like is used.

The long-scale cable support wire portion 4 is laid by monolithically connecting to the long,-scale optical element portion 3 parallel thereto with the constricted neck portion 9 interposed therebetween.

The cable support wire portion 4 is constituted by coating a sheath 22 formed of a thermoplastic resin on, for example, a support wire B as a second tension member. The support wire B is composed of a metal wire, for example, a steel wire.

Figure 7:
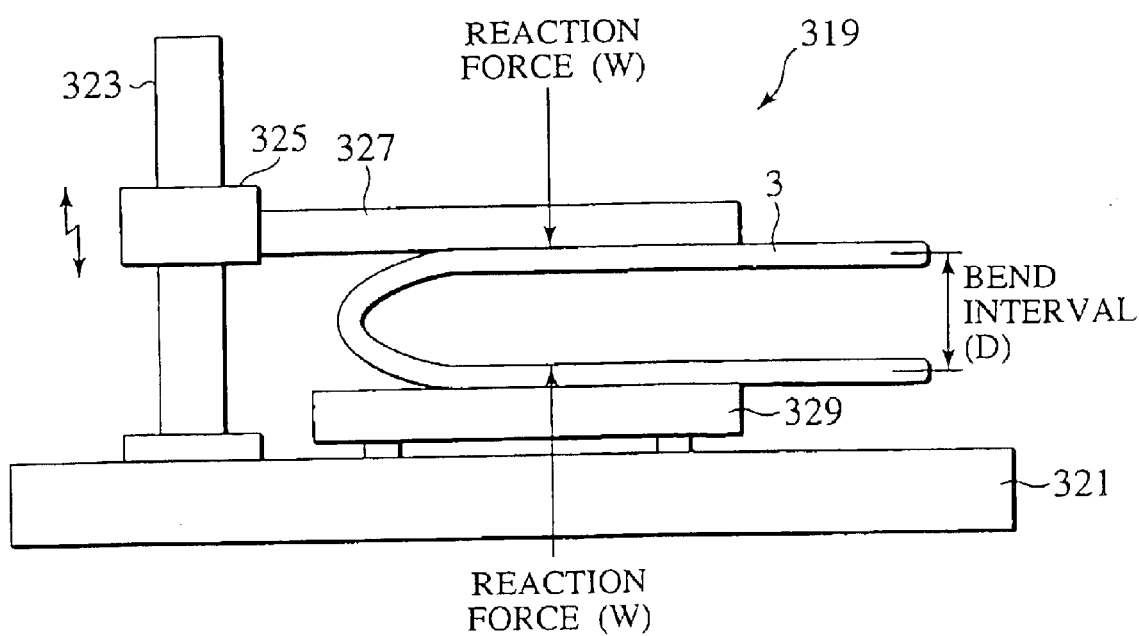
FIG. 7 is an explanatory view schematically showing a flexural rigidity testing machine for the optical element portion of the optical fiber drop cable.

Investigation was made in order to improve the accommodating workability of the optical fiber drop cable 301 as described above in the cable closure. Then, it was found out that it was particularly an important factor to adjust a flexural rigidity of the optical element portion 3 appropriately. Specifically, various prototypes of the optical fiber drop cable 301 were made by changing a material and an outer diameter of the tension member A' of the optical element portion 3. The flexural rigidities of the various prototypes of the optical element portion 3 of the cable 1 were measured by use of a flexural rigidity testing machine 319 as shown in FIG. 7. Comparative investigation was made for the accommodability thereof in the cable closure and the separability of the cable support wire portion 4 and the optical element portion 3.

With reference to FIG. 7, in the flexural rigidity testing machine 319, a slider 325 is provided around a support pillar 323 erected on a surface plate 321 so as to be movable and adjustable in the vertical direction, and on this slider 325, a press plate 327 is extended substantially parallel to an upper surface of the surface plate 321. On the surface plate 321, a load cell type scale 329 is mounted. The flexural rigidity testing machine 319 is constituted in such a manner that the optical element portion 3 of the optical fiber drop cable 301 to be measured is sandwiched in a bent state between an upper surface of the load cell type scale 329 and a lower surface of the press plate 327 with a preset bend interval (D).

A flexural rigidity testing method is carried out under the condition where a sample length of the optical element portion 3 is 150 mm and the bend interval (D) is maintained to be 30 mm. Then, after the elapse of one minute, reaction force (W) of the sample was measured by use of the load cell type scale 329. Tie flexural rigidity of the optical element portion 3 is calculated by the following expression:

$$\text{Flexural rigidity (EI)} = 0.3486 W D^2 \quad (1).$$

The measurement was carried out at least five times, and an average of calculated values of the flexural rigidities is employed as a measurement value.

With regard to various prototypes of the cable 301, the flexural rigidities were measured by the flexural rigidity testing method, and comparative investigation was made in view of convenience for accommodation thereof in the cable closure and for separation of the cable support wire portion 4 and the optical element portion 3. In the comparison, standard criteria were provided for adaptation for the accommodation in the cable closure and for the separation of the cable support wire portion 4 and the optical element portion 3. The case where these criteria are satisfied was defined as "yes", otherwise, "no".

FIG. 8 is a table showing evaluation results of conformity with the standard criteria when a steel wire is used for the tension member A' (tension member: TM) of the optical element portion 3. FIG. 9 is a table showing evaluation results of conformity with the standard criteria when the Kevlar (aramid fiber) is used for the tension member A' (TM). FIG. 10 is a table showing evaluation results of conformity with the standard criteria when engineering plastics having a modulus of elasticity of 20000 N/mm$^2$ for the tension member A' (TM).

From the experiment described above, with regard to the optical fiber drop cable 301 of this embodiment, it was confirmed that the optical fiber core wire 1 was broken whelk the cable support wire portion 4 and the optical element portion 3 were separated in the case where the flexural rigidity of the optical element portion 3 was set to be 80 Nmm$^2$=80×10$^{-6}$ Nm$^2$ or lower. Consequently, it was made apparent that the flexural rigidity of the optical element portion was deeply related to the accommodation and the separation. Specifically, the flexural rigidity of the optical element portion 3 is set in a range from 80 to 500 Nmm$^2$, and preferably, in a range from 100 to 400 Nmm$^2$, and thus the convenience for accommodation of the optical element portion in the cable closure is good, and it is made possible to separate the cable support wire portion 4 and the optical element portion 3.

With regard to the first tension members A' (TM), the following is understood. Specifically, the diameter of the steel wire is set in a range from 0.16 to 0.38 mm, the yarn fineness (diameter) of the aramid fiber is set in a range from 2500 d (denier) to 18500 d, and the diameter of the engineering plastics is set in a range from 0.48 to 1.15 mm. Thus, the flexural rigidity of the optical element portion 3 is set in the proper range from 80 to 500 Nmm$^2$.

Note that the present invention is not limited to the above-described embodiment, and can be executed according to other aspects by performing appropriate modification therefor.

The flexural rigidity of the optical element portion is set in the range from 80 to 500 Nm$^2$, and thus the accommodating workability of the optical element portion in the cable closure becomes good, and the cable support wire portion and the optical element portion can be readily separated without being broken.

When each of the first tension members of the optical element portion is a steel wire, the diameter of the steel wire is set in the range from 0.16 to 0.38 mm, and thus the flexural rigidity can be set at a proper value. Furthermore, when each first tension member of the optical element portion is an aramid fiber, the yarn fineness of the aramid fiber is set in the range from 2500 to 18500 denier, and thus the flexural rigidity can be set at a proper value. Furthermore, when the first tension member of the optical element portion is engineering plastics, the diameter of the engineering plastics is set in the range from 0.48 to 1.15 mm, and thus the flexural rigidity can be set at a proper value.

This application claims benefit of priority under 35 USC §119 to Japanese Patent Applications No. 2001-215580 filed on Jul. 16, 2001, No. 2001-283869 filed on Sep. 18, 2001, and No. 2002-028492 filed on Feb. 5, 2002, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An optical fiber drop cable comprising:
   an optical element portion comprising an optical fiber and a pair of first tension members coated with a first sheath, at least one of the first tension members comprising a star-shaped cross section, a portion of the first sheath disposed in voids defined by the star-shaped cross section;
   a support wire portion comprising a second tension member coated with a second sheath; and
   a neck portion connecting the optical element portion and the support wire portion, the neck portion defining slits formed intermittently along a length of the neck portion.

2. The cable according to claim 1 wherein at least one of the first tension members comprises an aggregate of nonconductive tension fibers.

3. The cable according to claim 1, wherein the first and second sheaths comprise a common thermoplastic resin.

4. The cable according to claim 2, wherein at least one of the fibers has a Young's modulus of at least 5000 kg/mm$^2$, and a quantity of the fibers is between 1000 and 2000 denier.

5. The cable according to claim 2, wherein a fiber filling factors of the fibers comprises at least 50% of a cross sectional area of the first tension members.

6. The cable according to claim 1, wherein at least one of the first tension members comprises a nonconductive material.

7. The cable according to claim 1, wherein the first tension members are disposed on opposite sides of the optical fiber.

8. The cable according to claim 1, wherein the first tension members extend in a direction about parallel to a direction in which the optical fiber extends.

9. An optical fiber drop cable comprising:
   an optical element portion comprising an optical fiber and a pair of first tension members coated with a sheath, at least one of the sheath tension members comprising a star-shaped cross section, a portion of the sheath disposed in voids defined by the star-shaped cross section,
   wherein at least one of the first tension members comprises an aramid fiber having a yarn fineness between 2500 and 18500 denier.

10. The cable according to claim 9, wherein each of the first tension members comprises the aramid fiber having the yarn fineness between 2500 and 18500 denier.

11. The cable according to claim 9, wherein a flexural rigidity of the optical element portion is between 80 and 500 Nmm$^2$.

* * * * *